US012770591B2

(12) United States Patent
Pai

(10) Patent No.: US 12,770,591 B2
(45) Date of Patent: Oct. 20, 2026

(54) COLLABORATION SYSTEM, METHOD, AND COMPUTER-READABLE MEDIUM FOR REALIZING ONLINE OFFSITE SYNCHRONOUS ENSEMBLE

(71) Applicant: CHUNGHWA TELECOM CO., LTD., Taoyuan City (TW)

(72) Inventor: Chuang Pai, Taoyuan City (TW)

(73) Assignee: CHUNGHWA TELECOM CO., LTD., Taoyuan City (TW)

( * ) Notice: Subject to any disclaimer, the term of this patent is extended or adjusted under 35 U.S.C. 154(b) by 1063 days.

(21) Appl. No.: 17/951,392

(22) Filed: Sep. 23, 2022

(65) Prior Publication Data

US 2023/0245635 A1 Aug. 3, 2023

(30) Foreign Application Priority Data

Jan. 28, 2022 (TW) ................................ 111104073

(51) Int. Cl.
*G10H 1/00* (2006.01)

(52) U.S. Cl.
CPC ..... *G10H 1/0008* (2013.01); *G10H 2240/175* (2013.01); *G10H 2240/325* (2013.01)

(58) Field of Classification Search
CPC .......... G10H 1/0008; G10H 2240/175; G10H 2240/325; G10H 2240/131; G10H 1/0033; G10H 1/0083; G10H 7/002; G10H 5/02; Y02P 90/02
See application file for complete search history.

(56) References Cited

U.S. PATENT DOCUMENTS

| | | | | |
|---|---|---|---|---|
| 6,009,457 A * | 12/1999 | Moller | G10H 1/0058 709/205 |
| 6,353,174 B1 * | 3/2002 | Schmidt | H04L 67/12 709/200 |
| 6,482,087 B1 * | 11/2002 | Egozy | A63F 13/12 84/645 |
| 6,660,922 B1 * | 12/2003 | Roeder | G09B 5/06 84/477 R |

(Continued)

FOREIGN PATENT DOCUMENTS

| | | | |
|---|---|---|---|
| JP | 6864938 B1 * | 4/2021 | G10H 1/00 |
| WO | WO-2019038019 A1 * | 2/2019 | H04L 65/403 |

(Continued)

*Primary Examiner* — Jeffrey Donels
(74) *Attorney, Agent, or Firm* — JCIPRNET

(57) ABSTRACT

A collaboration system, a collaboration method and a computer-readable medium for realizing online offsite synchronous ensemble are provided, in which before performing a synchronous ensemble of the same song, a controlling device and a controlled device respectively pre-download a music score of the same song from a server device, so that the controlling device sets a note starting position of the music score when the same song is performed, and then the controlling device and the controlled device synchronize the note starting position of the music score of the same song, such that when the controlling device executes a start playing command of the music score of the same song, the controlling device and the controlled device start to play the music score of the same song note by note synchronously according to the note starting position of the music score of the same song.

18 Claims, 10 Drawing Sheets

(56) References Cited

U.S. PATENT DOCUMENTS

| | | | | |
|---|---|---|---|---|
| 7,405,355 | B2 * | 7/2008 | Both | H04L 47/22 84/645 |
| 7,714,222 | B2 * | 5/2010 | Taub | G10H 1/0058 84/600 |
| 9,857,934 | B2 * | 1/2018 | Humphrey | G10H 1/0058 |
| 10,182,093 | B1 * | 1/2019 | Klapuri | G10H 1/0066 |
| 10,627,782 | B2 * | 4/2020 | Oda | G06F 17/11 |
| 10,911,501 | B2 * | 2/2021 | Rofe | H04N 5/073 |
| 11,310,538 | B2 * | 4/2022 | Holmberg | H04N 21/43072 |
| 11,563,504 | B2 * | 1/2023 | Galuten | G10H 1/0058 |
| 11,616,589 | B2 * | 3/2023 | Galuten | H04J 3/0664 370/503 |
| 11,724,202 | B2 * | 8/2023 | Youm | G10H 1/0058 463/42 |
| 12,136,406 | B2 * | 11/2024 | Edwards | G10H 1/0083 |
| 12,266,331 | B2 * | 4/2025 | Palmer | G10H 1/0058 |
| 2003/0164084 | A1 * | 9/2003 | Redmann | G10H 1/0058 84/615 |
| 2006/0283310 | A1 * | 12/2006 | Bicker | H04L 65/762 84/645 |
| 2007/0039449 | A1 * | 2/2007 | Redmann | G10H 1/0058 84/609 |
| 2007/0163428 | A1 * | 7/2007 | Salter | G10H 1/0058 84/611 |
| 2008/0060499 | A1 * | 3/2008 | Sitrick | G09B 15/002 84/477 R |
| 2008/0113797 | A1 * | 5/2008 | Egozy | A63F 13/12 84/600 |
| 2015/0046824 | A1 * | 2/2015 | Humphrey | G10H 1/0058 715/727 |
| 2016/0358595 | A1 * | 12/2016 | Sung | G11B 27/34 |
| 2017/0287457 | A1 * | 10/2017 | Vorobyev | G10H 1/0033 |
| 2018/0196393 | A1 * | 7/2018 | Oda | G10H 1/0058 |
| 2019/0306540 | A1 * | 10/2019 | Holmberg | H04N 21/632 |
| 2019/0355336 | A1 * | 11/2019 | Steinwedel | H04L 12/1813 |

FOREIGN PATENT DOCUMENTS

| | | | | | |
|---|---|---|---|---|---|
| WO | WO-2019241778 | A1 * | 12/2019 | | G11B 27/031 |
| WO | WO-2021050902 | A1 * | 3/2021 | | G10H 1/0058 |

* cited by examiner

[3] Synchronous playing of the music score note by note

COLLABORATION SYSTEM, METHOD, AND COMPUTER-READABLE MEDIUM FOR REALIZING ONLINE OFFSITE SYNCHRONOUS ENSEMBLE

BACKGROUND

1. Technical Field

The present disclosure relates to a music-assisted collaboration technology, and more particularly, to a collaboration system, method and computer-readable medium for realizing online offsite synchronous ensemble.

2. Description of Related Art

In a conventional technique, a display device with a controller is used in the same field to achieve synchronous scrolling of a music score of a controlling end and a controlled end. However, in the Internet environment, this technique cannot achieve the purpose of synchronous scrolling of the music score, let alone the goal of playing the music score synchronously note by note.

At the same time, when the controlling end and the controlled end are located at different nodes of the Internet, a data transmission delay of the Internet is much greater than that of the local area network, which makes it difficult to control the situation of data transmission delay, and it is impossible to achieve an effect of playing the music score synchronously note by note.

In addition, in an operating mode of the existing service, although a low-latency audio transmission technique can be combined with a pure audio interaction method to perform ensemble, that is, musicians in different places can mutually adjust each other's playing speed through audio. This operating mode is aimed at songs with a slower rhythm, and the dissonance during the ensemble process is less pronounced, but for songs with a faster rhythm, the dissonance during the ensemble process will appear, which will seriously affect the ensemble experience.

Furthermore, compared with the related businesses or services in the current market, it is neither able to provide a mechanism for synchronizing the playback of music scores in remote locations note by note, nor to optimize the user experience of offsite ensembles.

Therefore, how to provide an innovative music-assisted or online offsite synchronous ensemble collaboration technique to solve any of the above problems or provide related functions/services has become a major research topic for those skilled in the art.

SUMMARY

The present disclosure provides an innovative collaboration system, method and computer-readable medium for realizing online offsite synchronous ensemble, which can provide musicians in two or more places in different fields, respectively, through a controlling device and a controlled device to realize a function of playing the music score of the same song note by note synchronously, so as to meet the needs or effects of ensemble music in different places, or can provide a user experience of long-distance synchronous ensemble suitable for various situations, or can provide a standard time of a server device to ensure that the time of the controlling device and the controlled device is the same or synchronized.

A collaboration system for realizing online offsite synchronous ensemble according to the present disclosure comprises: a controlling device in a first place; at least one controlled device in at least one second place different from the first place, wherein the controlling device is connected or communicated with the controlled device via a network; and a server device connecting or communicating with the controlling device and the controlled device via the network, wherein the controlling device and the controlled device respectively receive a music score of a same song from the server device before performing the synchronous ensemble of the same song via the network or online, wherein the controlling device sets a note starting position regarding the music score of the same song when the same song is performed, and the controlling device and the controlled device synchronize the note starting position of the music score of the same song, such that when the controlling device executes a start playing command of the music score of the same song, the controlling device and the controlled device start to play the music score of the same song note by note synchronously according to the note starting position of the music score of the same song.

A collaboration method for realizing online offsite synchronous ensemble according to the present disclosure comprises: providing a controlling device, at least one controlled device and a server device, wherein the controlling device is in a first place, and the at least one controlled device is in at least one second place different from the first place, wherein the controlling device, the controlled device and the server device are connected or communicated with each other via a network; receiving, by the controlling device and the controlled device respectively, a music score of a same song from the server device before performing the synchronous ensemble of the same song via the network or online; setting, by the controlling device, a note starting position regarding the music score of the same song when the same song is performed; and synchronizing, by the controlling device and the controlled device, the note starting position of the music score of the same song, wherein when the controlling device executes a start playing command of the music score of the same song, the controlling device and the controlled device start to play the music score of the same song note by note synchronously according to the note starting position of the music score of the same song.

A computer-readable medium of the present disclosure is applied to a computing device or a computer, and stores instructions to execute the above-mentioned collaboration method for realizing online offsite synchronous ensemble.

In order to make the above-mentioned features and advantages of the present disclosure more clear and easy to understand, the following embodiments are given and described in detail with the accompanying drawings. Additional features and advantages of the present disclosure will be set forth in part in the description that follows, and in part will be apparent from the description, or may be learned by practice of the present disclosure. It is to be understood that both the foregoing general description and the following detailed description are exemplary and explanatory and are not intended to limit the scope of the present disclosure as claimed.

DETAILED DESCRIPTIONS

The following describes the implementation of the present disclosure with examples. Those skilled in the art can easily understand other advantages and effects of the present disclosure from the contents disclosed in this specification. However, the present disclosure can also be implemented or applied by other different embodiments.

Figure 1:
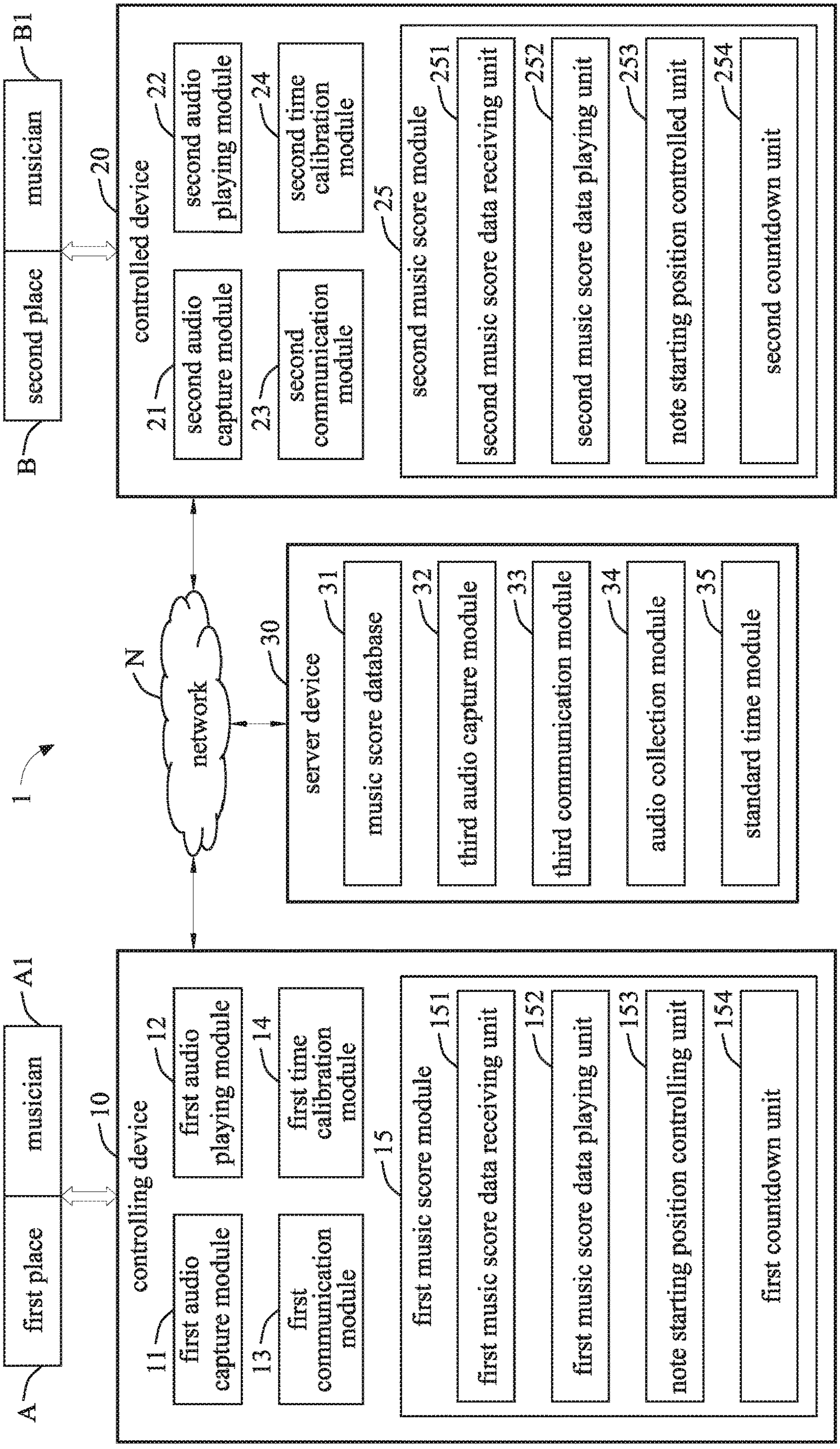
FIG. 1 is a schematic diagram of an architecture of a collaboration system for realizing online offsite synchronous ensemble according to the present disclosure.

FIG. 1 is a schematic diagram of an architecture of a collaboration system 1 for realizing online offsite synchronous ensemble according to the present disclosure. As shown in the figure, the collaboration system 1 for realizing online offsite synchronous ensemble includes a controlling device 10 of a controlling end, a controlled device 20 of at least one (e.g., a plurality of) controlled end and a server device 30 of a server end connected or communicated with each other through a network N. In addition, in the present disclosure, "at least one" means one or more (such as one, two, three, or more), "plurality" means two or more (such as two, three, four, five, or more than ten), "connected" or "communicated" represents a wired or wireless connection or communication, and the network N can be a wired network, a wireless network, the Internet, a local area network (LAN), a wireless local area network (WLAN), a wide area network (WAN), a metropolitan area network (MAN), a virtual private network (VPN), and the like. "Music score" represents an electronic music score, and the like, "Start broadcast" represents "Start playback," and "Musician" also represents singers, etc.

In one embodiment, the controlling device 10 and at least one (e.g., a plurality of) musician A1 are located in a first place A, the controlled device 20 and at least one (e.g., a plurality of) musician B1 are located in at least one second place B different from the first place A, and the server device 30 may be located in the first place A, the second place B or other locations. The controlling device 10 at the first place A connects or communicates with the controlled device 20 at the second place B through the network N, and the server device 30 connects or communicates with the controlling device 10 at the first place A and the controlled device 20 at the second place B through the network N. In one embodiment, if there are plural controlled devices 20, the plurality of controlled devices 20 may be located in a plurality of identical or different second places B, respectively. It should be noted that the controlling device 10 and the controlled device 20 can be interchanged, that is, the controlling device 10 can be changed to be the controlled device 20, and the controlled device 20 can be changed to be the controlling device 10, depending on the controlling device 10 and the controlled device 20 as a master or a slave. In another embodiment, the controlling device 10 and the server device 30 are integrated into the same device.

The controlling device 10 has a first audio capture module 11, a first audio playing module 12, a first communication module 13, a first time calibration module 14 and a first music score module 15, and the first music score module 15 has a first music score data receiving unit 151, a first music score data playing unit 152, a note starting position controlling unit 153 and a first countdown unit 154. Each controlled device 20 has a second audio capture module 21, a second audio playing module 22, a second communication module 23, a second time calibration module 24 and a second music score module 25, and the second music score module 25 has a second music score data receiving unit 251, a second music score data playing unit 252, a note starting position controlled unit 253 and a second countdown unit 254. The server device 30 has a music score database 31, a third audio capture module 32, a third communication module 33, an audio collection module 34 and a standard time module 35.

In one embodiment, the controlling device 10 or the controlled device 20 may be a computer, a mobile device, etc., such as a personal computer, a tablet computer, a notebook computer, a desktop computer, a smart phone, a personal digital assistant (PDA), and the like. The server device 30 can be a server (server host) or the like, such as a general server, a cloud server, a network server, a remote server, and the like. In another embodiment, the controlling device 10, the controlled device 20 or the server device 30 may be a single apparatus or a combination of multiple apparatuses.

In one embodiment, the first audio capture module 11, the second audio capture module 21 or the third audio capture module 32 may be an audio capture device (chip/circuit), an audio capture software (program), and the like. The first audio playing module 12 or the second audio playing module 22 may be an audio playing device (chip/circuit), an audio playing software (program), and the like. The first communication module 13, the second communication module 23 or the third communication module 33 may be a communication device (chip/circuit), a communication interface, a communication software (program), and the like. The first time calibration module 14 or the second time calibration module 24 may be a time calibration device (chip/circuit), a time calibration software (program), and the like. The first music score data receiving unit 151 or the second music score data receiving unit 251 may be a music score data receiving device (chip/circuit), a music score data receiving software (program), or the like.

In one embodiment, the first music score data playing unit 152 or the second music score data playing unit 252 may be a music score data playing device, a music score data playing software (program), and the like. The note starting position controlling unit 153 may be a note starting position controlling device (chip/circuit), a note starting position controlling software (program), and the like. The first countdown unit 154 or the second countdown unit 254 may be a countdown timer, a countdown timing software (program) and the like. The note starting position controlled unit 253 may be a note starting position controlled device (chip/circuit), a note starting position controlled software (program), and the like. The music score database 31 may be a music score data server, a music score data storage, a music score data storage medium, and the like. The audio collection module 34 may be an audio collecting device (chip/circuit), an audio collecting software (program), and the like. The standard time module 35 may be a standard time generator, a standard time calibrator, a standard time generating software (program), a standard time calibrating software (program), and the like.

The first audio capture module 11 of the controlling device 10 captures a live audio (e.g., audio data) of the controlling device 10, and the first audio playing module 12 plays the audio (e.g., audio data) of both the controlling device 10 and the controlled device 20 collected by the server device 30. The first communication module 13 transmits the audio (e.g., audio data) of the controlling device 10 captured by the first audio capture module 11 to the server device 30, and receives the audio (e.g., audio data) of both the controlling device 10 and the controlled device 20 collected by the server device 30. The first time calibration module 14 regularly queries the standard time of the server device 30 to calibrate the time of the controlling device 10 according to the standard time of the server device 30 (i.e., the query result). The first music score data receiving unit 151 of the first music score module 15 receives music scores (e.g., music score data) from the music score database 31 of the server device 30, and the first music score data playing unit 152 plays the music scores (e.g., music score data) from the music score database 31 of the server device 30. The note starting position controlling unit 153 sets a note starting position and a playing starting time of the music score of the controlling device 10. The first countdown unit 154 provides a countdown function, so that when the countdown of the first countdown unit 154 ends or is completed, the first music score data playing unit 152 starts to play the music score of the same song note by note synchronously.

The second audio capture module 21 of each controlled device 20 captures a live audio (e.g., audio data) of the controlled device 20, and the second audio playing module 22 plays the audio (e.g., audio data) of both the controlling device 10 and the controlled device 20 collected by the server device 30. The second communication module 23 transmits the audio (e.g., audio data) of the controlled device 20 captured by the second audio capture module 21 to the server device 30, and receives the audio (e.g., audio data) of both the controlling device 10 and the controlled device 20 collected by the server device 30. The second time calibration module 24 regularly queries the standard time of the server device 30 to calibrate the time of the controlled device 20 according to the standard time of the server device 30 (i.e., the query result). The second music score data receiving unit 251 of the second music score module 25 receives music scores (e.g., music score data) from the music score database 31 of the server device 30, and the second music score data playing unit 252 plays the music scores (e.g., music score data) from the music score database 31 of the server device 30. The note starting position controlled unit 253 receives commands (e.g., trigger signals) from the controlling device 10 to set a note starting position and a playing starting time of the music score of the controlled device 20. The second countdown unit 254 provides a countdown function, so that when the countdown of the second countdown unit 254 ends or is completed, the second music score data playing unit 252 starts to play the music score of the same song note by note synchronously.

The music score database 31 of the server device 30 is used for the controlling device 10 and the controlled device 20 to pre-download the music score (e.g., music score data) of the same song. The third audio capture module 32 captures the audio (e.g., audio data) from both the controlling device 10 and the controlled device 20, the third communication module 33 provides the audio (e.g., audio data) mixed by the audio collection module 34 to the controlling device 10 and the controlled device 20 at the same time, the audio collection module 34 mixes the captured audio (e.g., audio data) of both the controlling device 10 and the controlled device 20, and the standard time module 35 provides the standard time of the server device 30.

Therefore, the controlling device 10, the controlled device 20 and the server device 30 are communicated with each other through the network N. The controlling device 10 provides the setting of the note starting position of the music score, the command to execute the synchronous playing of the music score and the presentation of the synchronous playing of the music score note by note. The controlled device 20 receives the information of the note starting position of the music score sent by the controlling device 10, controls the note starting position of the music score of the controlled device 20 to be consistent with the controlling device 10 and receives a starting command sent by the controlling device 10. During the execution of the above-mentioned controlling device 10 and controlled device 20, the server device 30 provides the controlling device 10 and the controlled device 20 with the download of the music score (such as music score or electronic music score data) of the same song (such as music), and the collection and mutual transmission of the audio, and time calibration information, etc. In one embodiment, through the setting of the note starting position, when the music score reaches a paragraph or needs to be repeated for practice, it can be restored to the original note starting position, so as to reduce the problem of synchronizing the position of the music score of each device during practice and reduce a lot of time. It can even be used as a reference or basis for analysis in subsequent exercises by the playing times of the note starting position.

Figure 2:
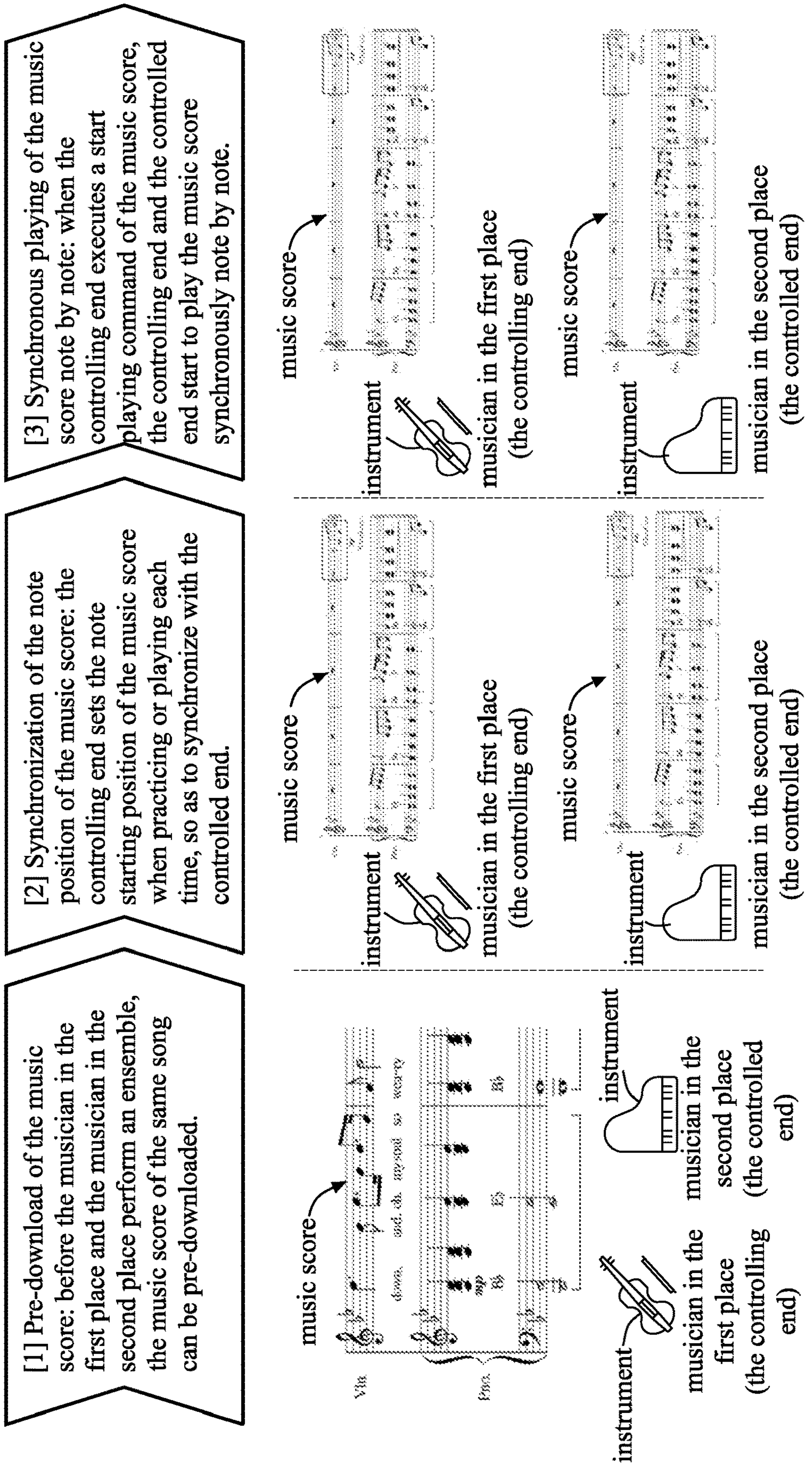
FIG. 2 is a schematic flow chart of a collaboration method for realizing online offsite synchronous ensemble according to the present disclosure.

FIG. 2 is a schematic flow chart of a collaboration method for realizing online offsite synchronous ensemble according to the present disclosure, and is described with reference to FIG. 1. At the same time, the main content of the collaboration method for realizing online offsite synchronous ensemble is as follows, and the rest of the content is the same as the description of FIG. 1 and the following FIG. 3 to FIG. 9, and the description is not repeated here.

Figure 9:
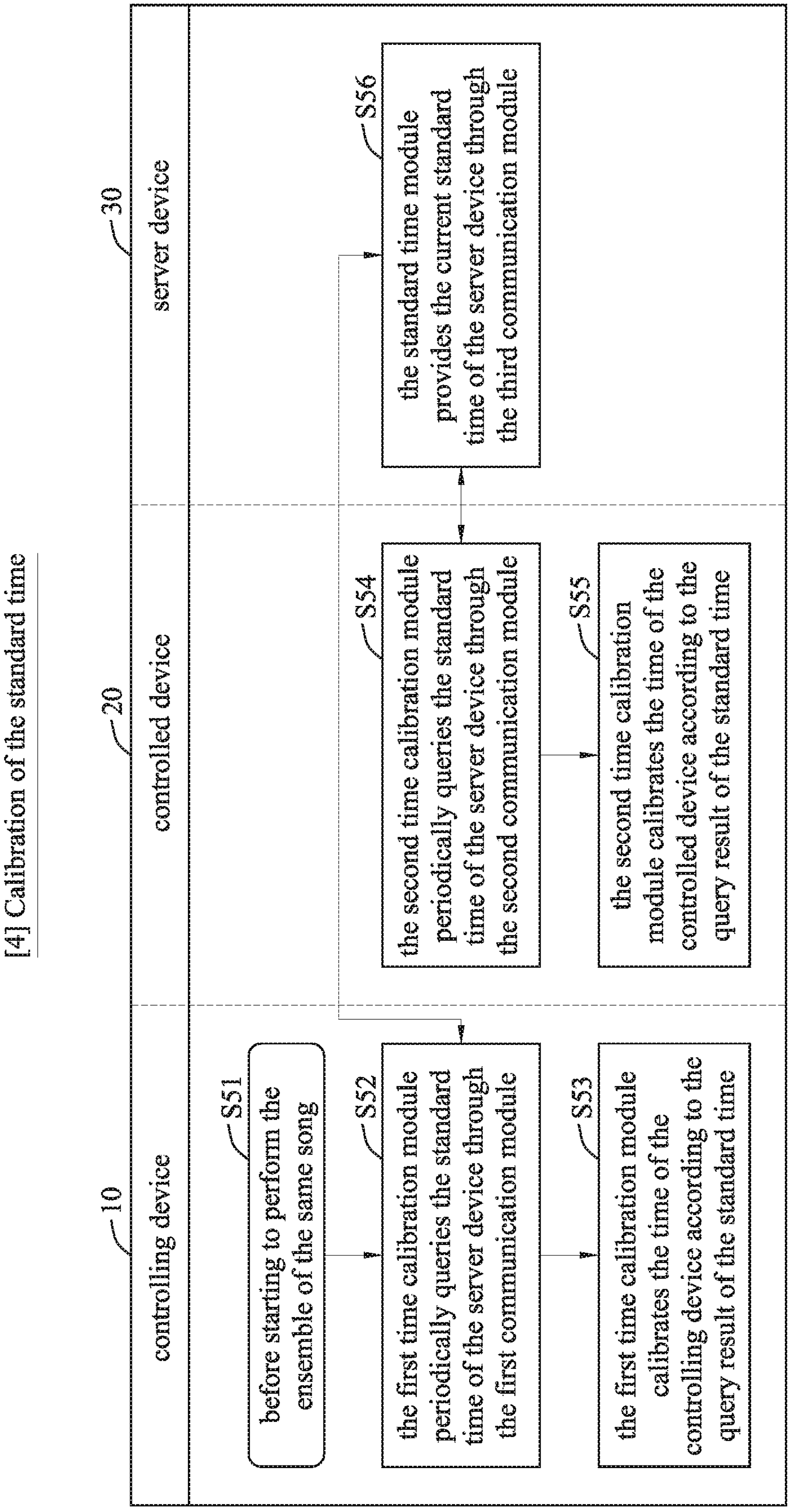
FIG. 9 is a schematic flow chart of calibration of the standard time in the collaboration system and method for realizing online offsite synchronous ensemble according to the present disclosure.

As shown in FIG. 2, the collaboration method for realizing online offsite synchronous ensemble mainly includes [1] pre-downloading of the music score, [2] synchronization of the note starting position of the music score, [3] synchronous playing of the music score note by note, and may further include [4] calibration of the standard time as shown in FIG. 9.

[1] Pre-downloading of the music score: before the controlling device 10 of the controlling end (musician A1 in the first place A) and the controlled device 20 of the controlled end (musician B1 in the second place B) perform an ensemble (i.e., synchronous ensemble in different places) of the same song through the network N or online, the music score of the same song can be pre-downloaded from the music score database 31 of the server device 30 on the server end respectively.

[2] Synchronization of the note starting position of the music score: the controlling device 10 of the controlling end sets the note starting position (i.e., a starting note position) of the music score of the same song when the same song is practiced or played each time, so that the controlling device

10 and the controlled device 20 synchronize the note starting position of the music score of the same song.

[3] Synchronous playing of the music score note by note: when the controlling device 10 of the controlling end executes a start playing command of the music score of the same song, the controlling device 10 and the controlled device 20 start to play the music score of the same song synchronously note by note according to the note starting position of the music score of the same song.

Figure 3:
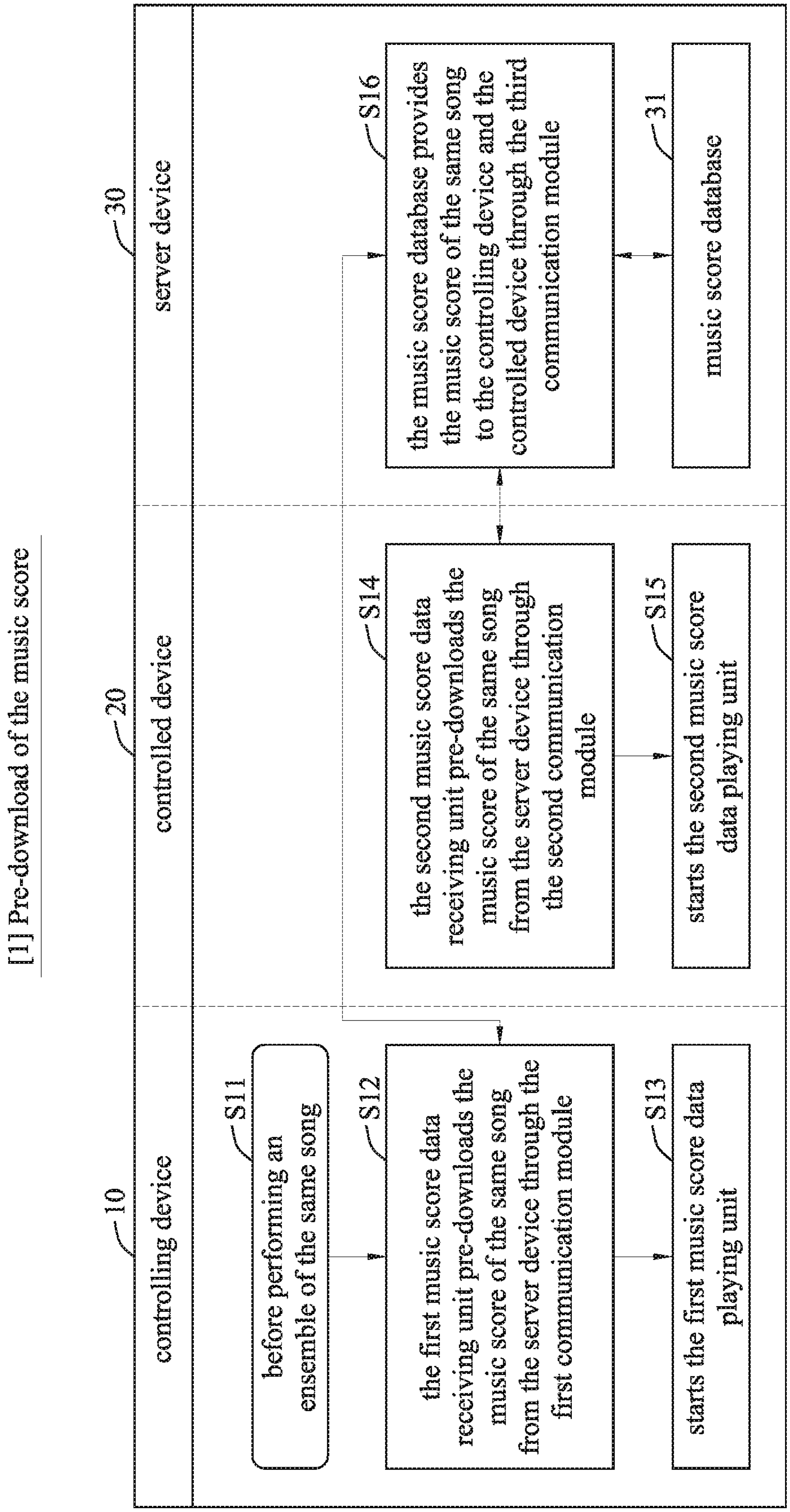
FIG. 3 and FIG. 4 are respectively a schematic flow chart and a schematic embodiment diagram of pre-downloading of the music score in the collaboration system and method for realizing online offsite synchronous ensemble according to the present disclosure.
Figure 4:
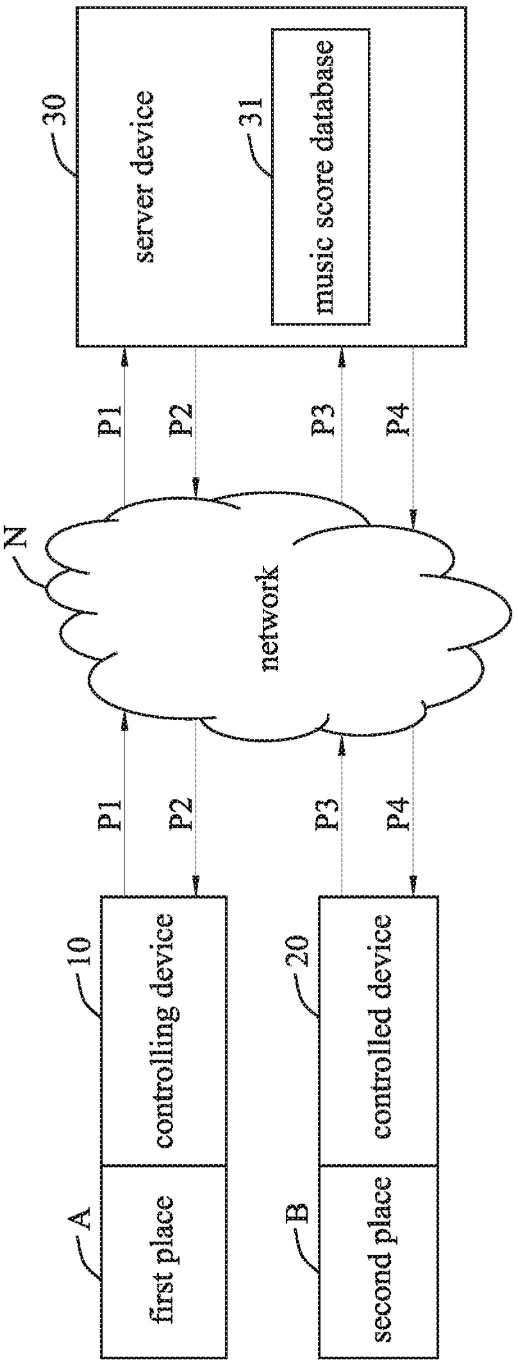

FIG. 3 and FIG. 4 are respectively a schematic flow chart and a schematic embodiment diagram of [1] pre-downloading of the music score in the collaboration system 1 and method for realizing online offsite synchronous ensemble according to the present disclosure, and are explained by referring to FIG. 1.

As shown in the flow chart of FIG. 3, in step S11 to step S13, before the controlling device 10 of the controlling end (the musician A1 in the first place A) and the controlled device 20 of the controlled end (the musician B1 in the second place B) perform an ensemble (i.e., synchronous ensemble in different places) of the same song online, the first music score data receiving unit 151 of the controlling device 10 pre-downloads the music score of the same song from the music score database 31 of the server device 30 through the first communication module 13, and starts the first music score data playing unit 152.

In step S14 to step S15, the second music score data receiving unit 251 of the controlled device 20 pre-downloads the music score of the same song from the music score database 31 of the server device 30 through the second communication module 23, and starts the second music score data playing unit 252.

Meanwhile, in step S16, the music score database 31 of the server device 30 provides the music score of the same song to the controlling device 10 and the controlled device 20 through the third communication module 33. Thereby, a procedure of pre-downloading the music score is completed.

Furthermore, in the embodiment shown in FIG. 4, taking the musician A1 in the first place A and the musician B1 in the second place B synchronizing to ensemble the song "You Raise Me Up" online as an example, the musician A1 in the first place A pre-downloads the music score of the same song from the music score database 31 of the server device 30 through the controlling device 10 to the first music score data playing unit 152 of the controlling device 10, that is, the controlling device 10 first requests the server device 30 to download a data of the music score of the same song in the music score database 31 through the network N (see arrow P1), and then the server device 30 provides the data of the music score of the same song in the music score database 31 through the network N to the first music score data playing unit 152 of the controlling device 10 (see arrow P2). In addition, the musician B1 in the second place B pre-downloads the music score of the same song from the music score database 31 of the server device 30 through the controlled device 20 to the second music score data playing unit 252 of the controlled device 20, that is, the controlled device 20 first requests the server device 30 to download a data of the music score of the same song in the music score database 31 through the network N (see arrow P3), and then the server device 30 provides the data of the music score of the same song in the music score database 31 through the network N to the second music score data playing unit 252 of the controlled device 20 (see arrow P4).

In one embodiment, the content of the music score may include a rhythm (such as beats per minute [BPM]), a time signature, and the type of musical note of each part and/or the sequencing information of each musical note, etc. Taking the rhythm as BPM 120 (i.e., 120 beats per minute) and the time signature as 4/4 (i.e., 4 beats per measure, ¼ musical note is one beat) as an example, the playing time of the ¼ musical note is ½ seconds, the playing time of the ⅛ musical note is ¼ seconds, and the playing time of the 1/16 musical note is ⅛ seconds, and so on. The sequencing information of each musical note can be used as the information exchange between the controlling device 10 and the controlled device 20 to synchronize the starting notes, and after the subsequent music score starts to play, the current progress indicator (bar) of the music score will stay on each note for the corresponding time according to the rules of the previous example.

Figure 5:
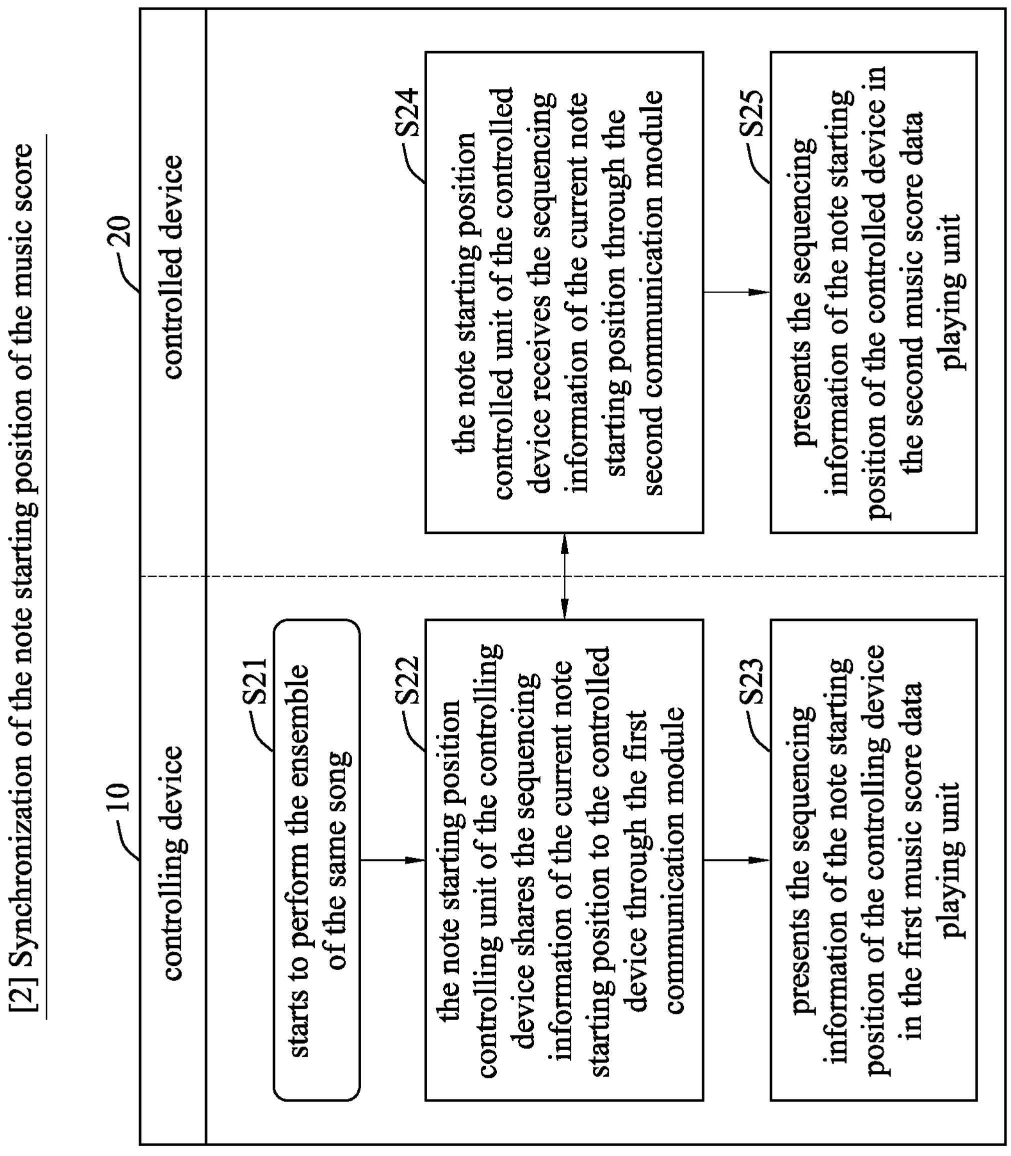
FIG. 5 and FIG. 6 are respectively a schematic flow chart and a schematic embodiment diagram of synchronization of the note starting position of the music score in the collaboration system and method for realizing online offsite synchronous ensemble according to the present disclosure.
Figure 6:
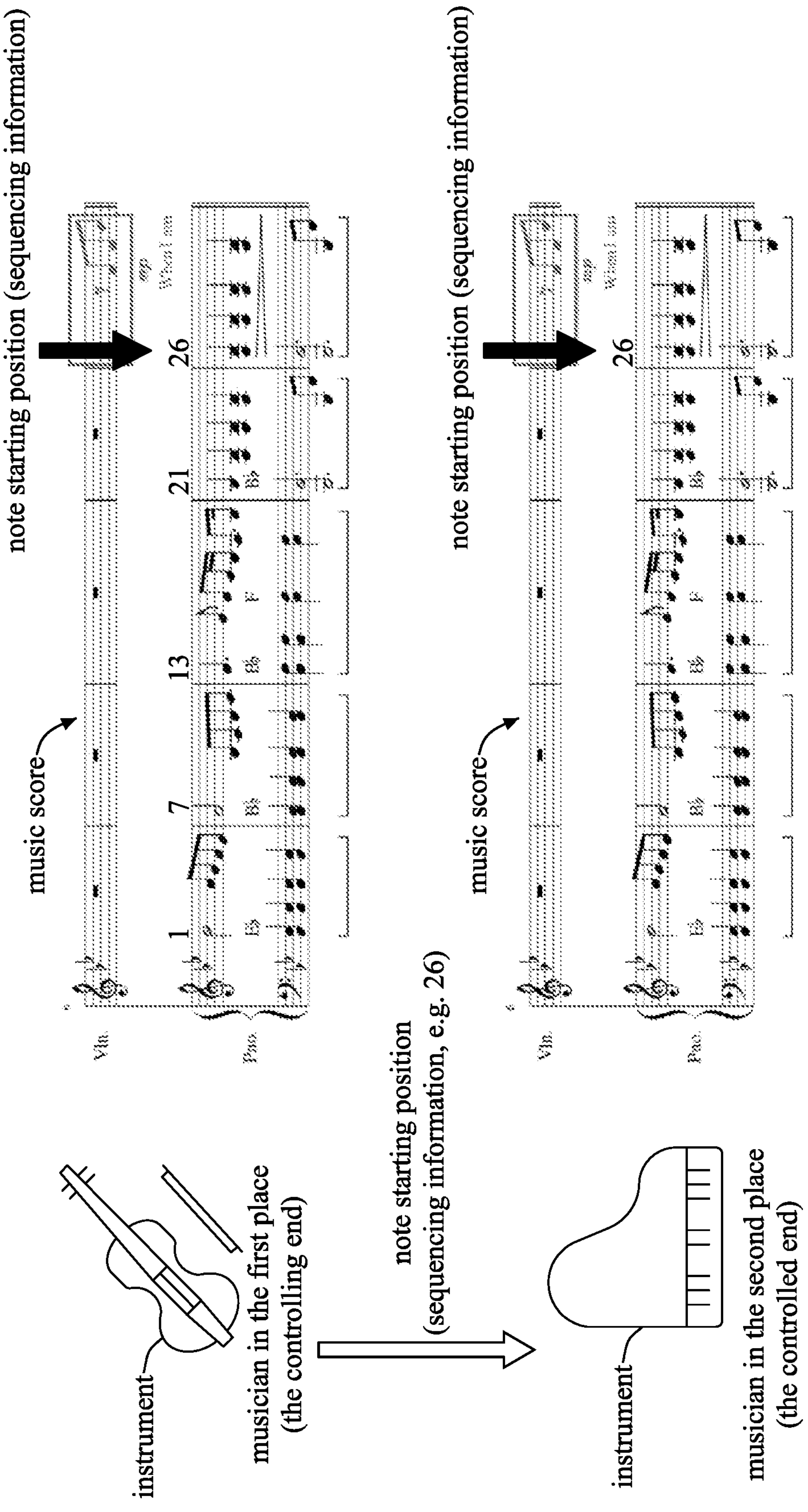

FIG. 5 and FIG. 6 are respectively a schematic flow chart and a schematic embodiment diagram of [2] synchronization of the note starting position of the music score in the collaboration system 1 and method for realizing online offsite synchronous ensemble according to the present disclosure, and are explained by referring to FIG. 1.

In the flow chart as shown in FIG. 5, in step S21 to step S23, the controlling device 10 of the controlling end starts to perform the ensemble of the same song (i.e., synchronous ensemble in different places), the note starting position controlling unit 153 of the controlling device 10 shares the sequencing information of the current note starting position to the controlled device 20 of the controlled end through the first communication module 13, and presents the sequencing information of the note starting position of the controlling device 10 in the first music score data playing unit 152.

In step S24 to step S25, the note starting position controlled unit 253 of the controlled device 20 receives the sequencing information of the current note starting position through the second communication module 23, and presents the sequencing information of the note starting position of the controlled device 20 in the second music score data playing unit 252. Thereby, a procedure of synchronization of the note starting position of the music score is completed.

Furthermore, in the embodiment shown in FIG. 6, taking the controlling device 10 setting the note starting position of the music score at the 5th bar of the music score as an example, the first music score data playing unit 152 of the controlling device 10 sets the note starting position of the music score at the first note of the 5th bar of the music score, and the sequencing information of the first note of the 5th bar is 26, and then both the controlling device 10 and the controlled device 20 synchronize the sequencing information (e.g., 26) of the note starting position of the music score. Next, after the controlled device 20 receives the sequencing information (e.g., 26) of the note starting position of the music score, the second music score data playing unit 252 of the controlled device 20 synchronizes the note starting position of the music score.

Figure 7A:
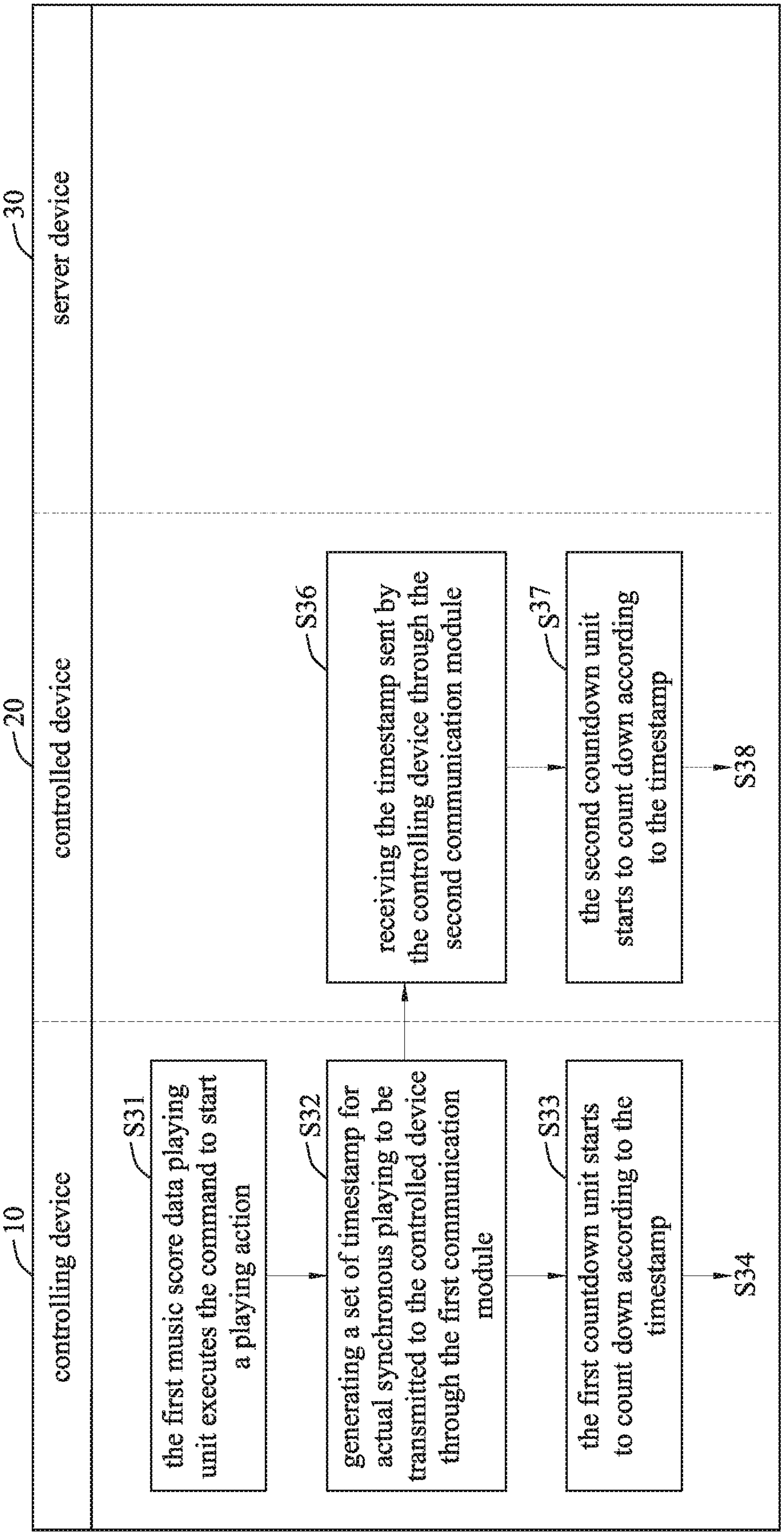
FIGS. 7A-7B and FIG. 8 are respectively a schematic flow chart and a schematic embodiment diagram of synchronous playing of the music score note by note in the collaboration system and method for realizing online offsite synchronous ensemble according to the present disclosure.
Figure 7B:
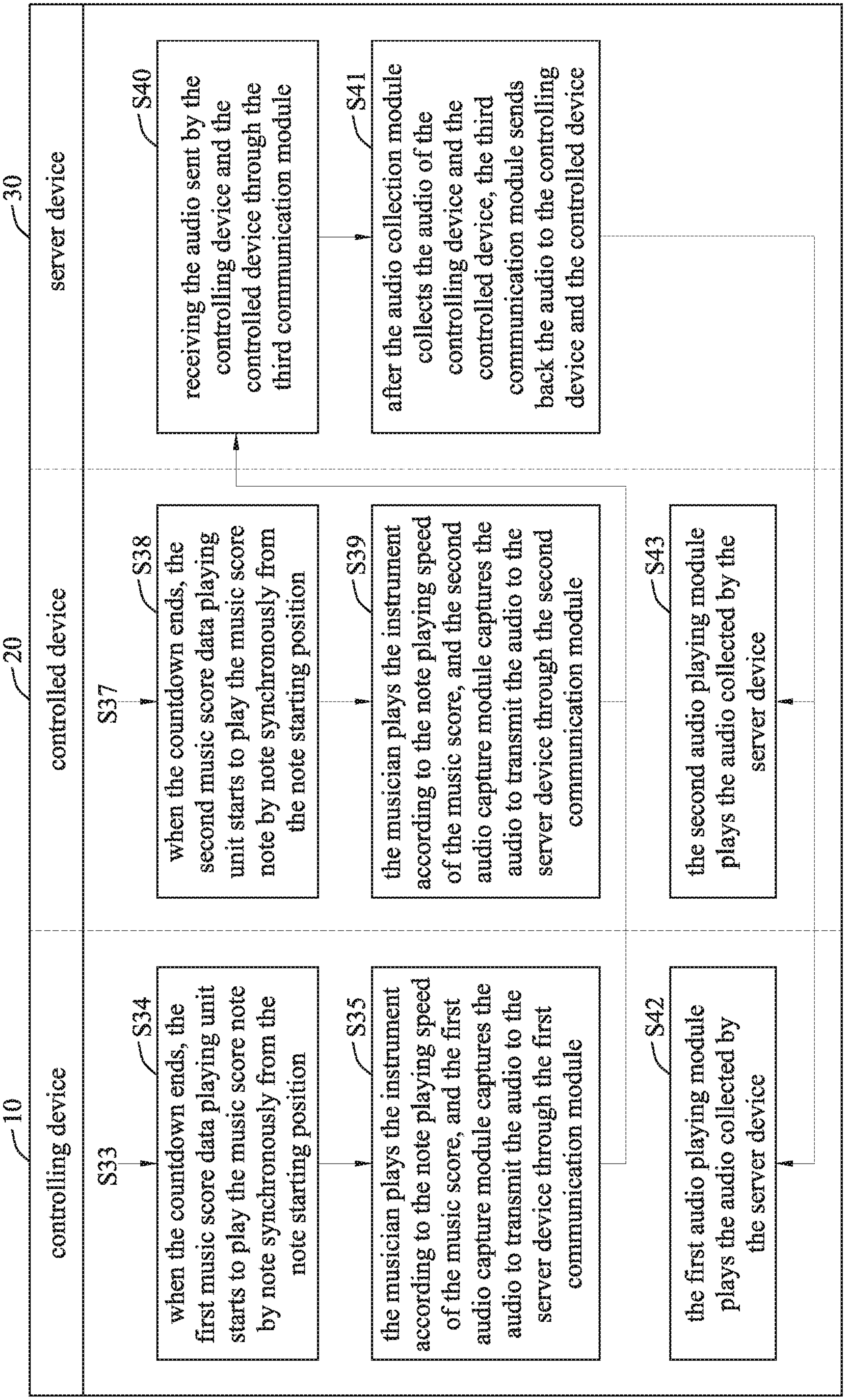
Figure 8:
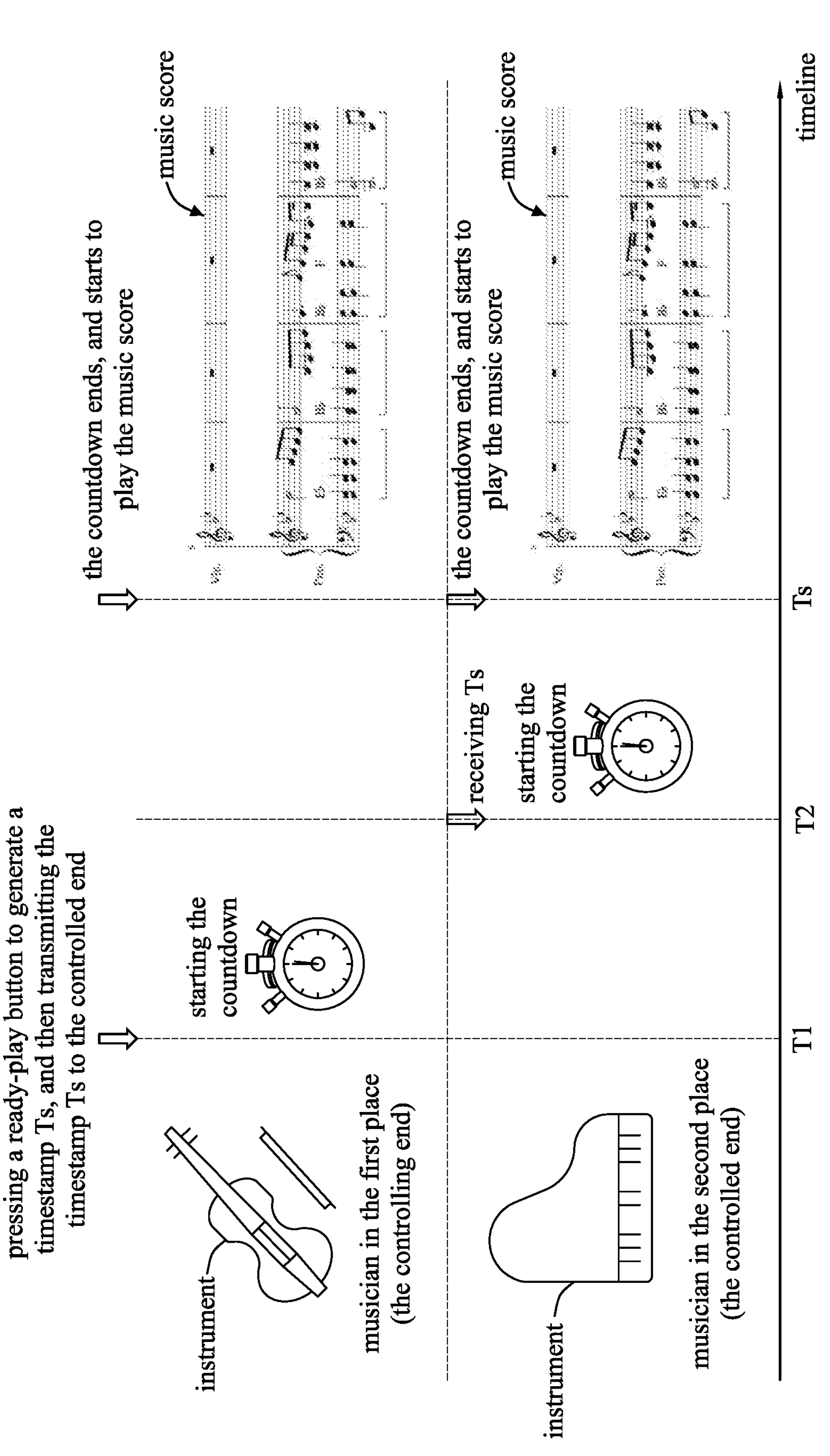

FIGS. 7A-7B and FIG. 8 are respectively a schematic flow chart and a schematic embodiment diagram of [3] synchronous playing of the music score note by note in the collaboration system 1 and method for realizing online offsite synchronous ensemble according to the present disclosure, and are explained by referring to FIG. 1.

As shown in the flow chart of FIGS. 7A-7B, regarding the controlling device 10, in step S31 to step S32, the first music score data playing unit 152 of the controlling device 10 executes the command to start a playing action, and the controlling device 10 generates a set of timestamp Ts for actual synchronous playing, so as to transmit the timestamp Ts to the controlled device 20 through the first communication module 13.

Next, in step S33 to step S35, the first countdown unit 154 of the controlling device 10 starts to count down according to the timestamp Ts; when the countdown of the first countdown unit 154 ends or is completed, the first music score data playing unit 152 starts to play the music score of the same song note by note synchronously from the note starting position of the music score; at the same time, the musician A1 in the first place A plays the instrument according to the note playing speed of the music score, and the first audio capture module 11 captures the live audio (e.g., audio data) of the controlling device 10 to transmit the audio (e.g., audio data) of the controlling device 10 to the server device 30 through the first communication module 13.

Regarding the controlled device 20, in step S36, the controlled device 20 receives the timestamp Ts sent by the controlling device 10 through the second communication module 23. Next, in step S37 to step S39, the second countdown unit 254 of the controlled device 20 starts to count down according to the timestamp Ts; when the countdown of the second countdown unit 254 ends or is completed, the second music score data playing unit 252 starts to play the music score of the same song note by note synchronously from the note starting position of the music score; at the same time, the musician B1 in the second place B plays the instrument according to the note playing speed of the music score, and the second audio capture module 21 captures the live audio (e.g., audio data) of the controlled device 20 to transmit the audio (e.g., audio data) of the controlled device 20 to the server device 30 through the second communication module 23.

Regarding the server device 30, in step S40 to step S41, the server device 30 receives the audio (e.g., audio data) sent by both the controlling device 10 and the controlled device 20 through the third communication module 33, and after the audio collection module 34 of the server device 30 collects the audio (e.g., audio data) of both the controlling device 10 and the controlled device 20, the third communication module 33 sends back the audio (e.g., audio data) collected by the audio collection module 34 to the controlling device 10 and the controlled device 20.

In step S42 to step S43, the first audio playing module 12 of the controlling device 10 synchronously plays the audio (e.g., audio data) collected by the audio collection module 34 of the server device 30, and the second audio playing module 22 of the controlled device 20 synchronously plays the audio (e.g., audio data) collected by the audio collection module 34 of the server device 30.

Furthermore, in the embodiment shown in FIG. 8, the musician A1 in the first place A (the controlling device 10 of the controlling end) and the musician B1 in the second place B (the controlled device 20 of the controlled end) play the music score online in the two places note by note synchronously. The embodiment can be applied to a situation of the controlling device 10 and at least one (e.g., a plurality of) controlled device 20. A situation of multiple controlled devices 20 is similar to that of a single controlled device 20, and the controlling device 10 synchronizes the timestamp Ts with all the controlled devices 20, and the operation of all the controlled devices 20 after receiving the timestamp Ts is the same as that of a single controlled device 20. In another embodiment, it is also applicable to a situation of a large ensemble, that is, the controlling device will provide different timestamps Ts to the respective controlled devices 20, so that the respective controlled devices 20 can still perform a large ensemble without hearing the performance of other instruments. In other words, with the provision of different timestamps Ts, the respective controlled devices 20 only need to perform performances according to the timestamps, and do not need to perform performances through the interaction of audio.

The musician A1 in the first place A presses a ready-play button of the controlling device 10 to generate a timestamp Ts, and then the controlling device 10 transmits the timestamp Ts to the controlled device 20. For example, the controlling device 10 executes the command to prepare to start playing through the first music score data playing unit 152 at time point T1 (e.g., 09:10:11.128), at this time, the controlling device 10 generates a set of timestamp Ts (e.g., 09:10:15.000) for the actual synchronous playing, that is, 4 whole seconds after the preset current time point T1 is the synchronous playing time. The synchronous playing time is a preparatory beat duration and can be adjusted flexibly.

Next, the controlling device 10 and the controlled device 20 synchronize the information of the timestamp Ts, and the first countdown unit 154 of the controlling device 10 starts the countdown (e.g., 0:0:3.872), and the countdown 0:0:3.872=09:10:15.000-09:10:11.128.

Next, the controlled device 20 receives the information of the timestamp Ts of the controlling device 10 at the time point T2 (e.g., 09:10:11.138), and starts the countdown (e.g., 0:0:3.862). At this time point T2, the point-to-point (peer-to-peer; P2P) network transmission delay between the first place A and the second place B (two places) is 10 ms (milliseconds) as an example (but not limited to this), and the countdown 0:0:3.862=09:10:15.000-09:10:11.138.

When both the controlling device 10 and the controlled device 20 have completed the countdown, both the controlling device 10 and the controlled device 20 will start to play the music score of the same song note by note synchronously according to the sequencing information (e.g., 26) of the note starting position of the music score. Since the local time of both the controlling device 10 in the first place A and the controlled device 20 in the second place B will be calibrated with the standard time of the server device 30, both the controlling device 10 and the controlled device 20 can play the music score of the same song note by note synchronously (see FIG. 9).

FIG. 9 is a schematic flow chart of [4] calibration of the standard time in the collaboration system 1 and method for realizing online offsite synchronous ensemble according to the present disclosure, and is explained by referring to FIG. 1.

As described in the above [3] synchronous playing of the music score note by note, both the controlling device 10 in the first place A and the controlled device 20 in the second place B play their respective music score synchronously note by note according to the same timestamp Ts, but if the time of the controlling device 10 in the first place A is not synchronized with the time of the controlled device 20 in the second place B, there will be a gap between the actual playing time of the first music score data playing unit 152 of the controlling device 10 and the second music score data playing unit 252 of the controlled device 20, so that they cannot be played in real synchronization. Therefore, ensuring that the time between the controlling device 10 (the first music score data playing unit 152) and the controlled device 20 (the second music score data playing unit 252) is the same is an important key to achieve the synchronous playing of the music score of the same song at the first place A and the second place B (two places).

In the flow chart as shown in FIG. 9, in step S51 to step S53, before the controlling device 10 starts to perform the ensemble (i.e., the ensemble in different places) of the same song, the first time calibration module 14 of the controlling device 10 periodically queries the standard time of the server device 30 through the first communication module 13, so that the first time calibration module 14 calibrates the time of the controlling device 10 according to the standard time of the server device 30 (i.e., the query result).

In step S54 to step S55, the second time calibration module 24 of the controlled device 20 periodically queries the standard time of the server device 30 through the second communication module 23, so that the second time calibration module 24 calibrates the time of the controlled device 20 according to the standard time of the server device 30 (i.e., the query result).

In step S56, the standard time module 35 of the server device 30 provides the current standard time of the server device 30 through the third communication module 33.

Further, the present disclosure also provides a computer-readable medium for a collaboration method for realizing online offsite synchronous ensemble, which is applied to a computing device or computer having a processor and/or a memory. Moreover, the computer-readable medium stores instructions, and the computer-readable medium can be executed by a computing device or computer through a processor and/or a memory, so as to execute the above-mentioned content when the computer-readable medium is executed. For example, the processor can be a microprocessor, a central processing unit (CPU), a graphics processing unit (GPU), etc., and the memory can be a random access memory (RAM), a memory card, a hard disk (such as a cloud/network hard disk), database, etc., but not limited thereto.

To sum up, the collaboration system, method and computer-readable medium for realizing online offsite synchronous ensemble according to the present disclosure at least have the following features, advantages or technical effects.

1. The present disclosure can provide musicians in two or more places in different fields, respectively, through the controlling device and the controlled device to realize the function of playing the music score of the same song note by note synchronously, so as to meet the needs or effects of ensemble music in different places.

2. The present disclosure can provide an auxiliary mechanism similar to a visual virtual conductor during the ensemble process, that is, a mechanism for synchronizing the music score of the controlling device and the controlled device to be played note by note, so as to provide the user experience of long-distance offsite synchronous ensemble suitable for various situations (such as rehearsal or formal performance), it can also be suitable for song ensemble of various rhythms (such as slow/medium/fast).

3. The mechanism of the present disclosure for synchronizing the music score note by note at a distance in different places is an innovative application, which is significantly different from the conventional technique, and can also optimize the user experience of the offsite ensemble.

4. During the period when group practicing is unavailable or under special circumstances (such as a severe epidemic), the present disclosure can provide a safe, convenient and time-saving group practicing mode, and also has the opportunity to achieve the goal of collaboratively completing the recording or output of music albums in different places.

5. The present disclosure can combine low-latency audio transmission technique to provide a delay-free experience, that is, through an optimization adjustment of an end-to-end (i.e., controlling device/controlled device/server device) process, and with the technique of synchronously playing the music score online note by note, it is beneficial to experience a high-quality, non-delayed experience comparable to an ensemble at the same location when multiple musicians (e.g., ensemble players) who are far apart (e.g., kilometers/hundreds of kilometers, different regions/cities/countries) perform group practice.

6. The standard time module of the server device of the present disclosure can provide standard time to ensure that the time of the controlling device and the controlled device is the same or synchronized, and can also achieve that the controlling device and the controlled device in two or more places (such as the first place and the second place) will play the music score of the same song synchronously note by note.

The foregoing embodiments are provided for the purpose of illustrating the principles and effects of the present disclosure, rather than limiting the present disclosure. Anyone skilled in the art can modify and alter the above embodiments without departing from the spirit and scope of the present disclosure. Therefore, the scope of protection with regard to the present disclosure should be as defined in the accompanying claims listed below.

What is claimed is:

1. A collaboration system for realizing online offsite synchronous ensemble, comprising:

a controlling device in a first place;

at least one controlled device in at least one second place different from the first place, wherein the controlling device is connected or communicated with the controlled device via a network; and a server device connecting or communicating with the controlling device and the controlled device via the network, wherein the controlling device and the controlled device respectively receive a music score of a same song from the server device before performing the synchronous ensemble of the same song via the network or online, wherein the controlling device sets a note starting position regarding the music score of the same song when the same song is performed, and the controlling device and the controlled device synchronize the note starting position of the music score of the same song, such that when the controlling device executes a start playing command of the music score of the same song, the controlling device and the controlled device start to play the music score of the same song note by note synchronously according to the note starting position of the music score of the same song, wherein the controlling device has a first time calibration module, a first countdown unit and a first music score data playing unit, wherein the first time calibration module queries a standard time of the server device to calibrate a time of the controlling device, and the first countdown unit starts a countdown, such that when the countdown of the first countdown unit ends, the first music score data playing unit starts to play the music score of the same song note by note synchronously.

2. The collaboration system of claim 1, wherein the controlling device has a first audio capture module, a first communication module and a first audio playing module, and the controlled device has a second audio capture module, a second communication module and a second audio playing module, wherein the first audio capture module and the second audio capture module capture a live audio of the controlling device and the controlled device respectively to transmit the audio of the controlling device and the controlled device respectively to the server device via the first communication module and the second communication module, such that the audio of both the controlling device and the controlled device collected by the server device is played synchronously by the first audio playing module and the second audio playing module.

3. The collaboration system of claim 2, wherein the server device has a music score database, a third audio capture module, an audio collection module and a third communication module for the controlling device and the controlled device to respectively pre-download the music score of the same song from the music score database, wherein the third audio capture module captures the audio from both the controlling device and the controlled device, and the audio collection module mixes the audio of both the controlling device and the controlled device, such that the third communication module provides the audio mixed by the audio collection module to the controlling device and the controlled device.

4. The collaboration system of claim 1, wherein the controlled device has a second time calibration module, a second countdown unit and a second music score data playing unit, wherein the second time calibration module queries the standard time of the server device to calibrate a time of the controlled device, and the second countdown unit starts a countdown, such that when the countdown of the second countdown unit ends, the second music score data playing unit starts to play the music score of the same song note by note synchronously.

5. The collaboration system of claim 1, wherein the controlling device further has a first music score data receiving unit and a note starting position controlling unit, wherein the first music score data receiving unit receives the music score from the server device, the note starting position controlling unit sets the note starting position and a start playing time of the music score of the controlling device, and the first music score data playing unit plays the music score from the server device.

6. The collaboration system of claim 5, wherein the controlled device has a second music score data receiving unit, a note starting position controlled unit and a second music score data playing unit, wherein the second music score data receiving unit receives the music score from the server device, the note starting position controlled unit receives a command from the controlling device to set the note starting position and a start playing time of the music score of the controlled device, and the second music score data playing unit plays the music score from the server device.

7. The collaboration system of claim 1, wherein the controlling device further has a note starting position controlling unit and a first communication module, and the controlled device has a note starting position controlled unit, a second communication module and a second music score data playing unit, wherein the note starting position controlling unit of the controlling device shares a sequencing information of the note starting position to the controlled device via the first communication module, such that the note starting position controlled unit of the controlled device receives the sequencing information of the note starting position via the second communication module, wherein the sequencing information of the note starting position of the controlling device is presented in the first music score data playing unit, and the sequencing information of the note starting position of controlled device is presented in the second music score data playing unit.

8. The collaboration system of claim 1, wherein the controlling device further has a first communication module, wherein the controlling device generates a timestamp for synchronous playing, and the timestamp is transmitted to the controlled device via the first communication module, wherein the first countdown unit starts the countdown according to the timestamp, such that when the countdown of the first countdown unit ends, the first music score data playing unit starts to play the music score of the same song note by note synchronously from the note starting position of the music score.

9. The collaboration system of claim 8, wherein the controlled device has a second communication module, a second countdown unit and a second music score data playing unit, wherein the controlled device receives the timestamp sent by the controlling device via the second communication module, and the second countdown unit starts a countdown according to the timestamp, such that when the countdown of the second countdown unit ends, the second music score data playing unit starts to play the music score of the same song note by note synchronously from the note starting position of the music score.

10. A collaboration method for realizing online offsite synchronous ensemble, comprising:

providing a controlling device, at least one controlled device and a server device, wherein the controlling device is in a first place, and the at least one controlled device is in at least one second place different from the first place, wherein the controlling device, the controlled device and the server device are connected or communicated with each other via a network;

receiving, by the controlling device and the controlled device respectively, a music score of a same song from the server device before performing the synchronous ensemble of the same song via the network or online;

setting, by the controlling device, a note starting position regarding the music score of the same song when the same song is performed;

synchronizing, by the controlling device and the controlled device, the note starting position of the music score of the same song, wherein when the controlling device executes a start playing command of the music score of the same song, the controlling device and the controlled device start to play the music score of the same song note by note synchronously according to the note starting position of the music score of the same song; and querying a standard time of the server device to calibrate a time of the controlling device and the controlled device by a first time calibration module of the controlling device and a second time calibration module of the controlled device respectively, wherein a first countdown unit of the controlling device and a second countdown unit of the controlled device respectively start a countdown, such that when the countdown of the first countdown unit and the second countdown unit ends, a first music score data playing unit of the controlling device and a second music score data playing unit of the controlled device respectively start to play the music score of the same song note by note synchronously.

11. The collaboration method of claim 10, further comprising capturing a live audio of the controlling device and the controlled device respectively by a first audio capture module of the controlling device and a second audio capture module of the controlled device, wherein the audio of the controlling device and the controlled device is transmitted respectively to the server device via a first communication module of the controlling device and a second communication module of the controlled device, such that the audio of both the controlling device and the controlled device collected by the server device is played synchronously by a first audio playing module of the controlling device and a second audio playing module of the controlled device.

12. The collaboration method of claim 11, further comprising pre-downloading the music score of the same song from a music score database of the server device by the controlling device and the controlled device respectively, wherein a third audio capture module of the server device captures the audio from both the controlling device and the controlled device, and an audio collection module of the server device mixes the audio of both the controlling device and the controlled device, such that a third communication module of the server device provides the audio mixed by the audio collection module to the controlling device and the controlled device.

13. The collaboration method of claim 10, further comprising receiving the music score from the server device by a first music score data receiving unit of the controlling device, wherein a note starting position controlling unit of the controlling device sets the note starting position and a start playing time of the music score of the controlling device, and the first music score data playing unit of the controlling device plays the music score from the server device.

14. The collaboration method of claim 13, further comprising receiving the music score from the server device by a second music score data receiving unit of the controlled device, wherein a note starting position controlled unit of the controlled device receives a command from the controlling device to set the note starting position and a start playing time of the music score of the controlled device, and the second music score data playing unit of the controlled device plays the music score from the server device.

15. The collaboration method of claim 10, further comprising sharing, by a note starting position controlling unit of the controlling device, a sequencing information of the note starting position to the controlled device via a first communication module of the controlling device, wherein a note starting position controlled unit of the controlled device receives the sequencing information of the note starting position via a second communication module of the controlled device, wherein the sequencing information of the note starting position of the controlling device is presented in the first music score data playing unit of the controlling device, and the sequencing information of the note starting position of the controlled device is presented in the second music score data playing unit of the controlled device.

16. The collaboration method of claim 10, further comprising generating, by the controlling device, a timestamp for synchronous playing, wherein the timestamp is transmitted to the controlled device via a first communication module of the controlling device, and the first countdown unit of the controlling device starts the countdown according to the timestamp, such that when the countdown of the first countdown unit ends, the first music score data playing unit of the controlling device starts to play the music score of the same song note by note synchronously from the note starting position of the music score.

17. The collaboration method of claim 16, further comprising receiving, by a second communication module of the controlled device, the timestamp sent by the controlling device, wherein the second countdown unit of the controlled device starts the countdown according to the timestamp, such that when the countdown of the second countdown unit ends, the second music score data playing unit of the controlled device starts to play the music score of the same song note by note synchronously from the note starting position of the music score.

18. A computer-readable medium applied to a computing device or a computer and storing instructions to execute the collaborative method for realizing online offsite synchronous ensemble of claim 10.

* * * * *